Oct. 26, 1937.  F. W. CORKILL  2,097,411
PROCESS OF TREATING HYDROUS BORATE MINERALS
Filed June 6, 1932
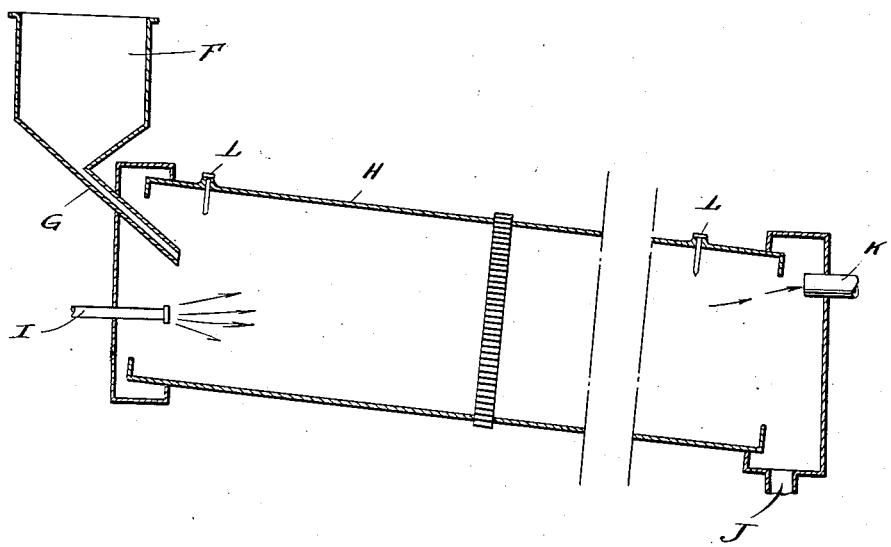
Inventor
Frederick W. Corkill,
By Riordan & Riordan
Attorney Patented Oct. 26, 1937

2,097,411

UNITED STATES PATENT OFFICE 2,097,411

PROCESS OF TREATING HYDROUS BORATE MINERALS

Frederick W. Corkill, Hinkley, Calif., assignor to Pacific Coast Borax Company, New York, N. Y., a corporation of Nevada Application June 6, 1932, Serial No. 615,747

9 Claims. (Cl. 23—59)

This invention relates to the treatment of certain minerals whereby to remove undesirable impurities and constituents therefrom, and thus obtain an ultimate product of recovery which is characteristically stable, and of substantially uncontaminated purity.

Among the minerals to which the present process is well adapted are boron bearing ores, containing hydrous borates such as rasorite, tinkal, ulexite, etc. However, most hydrous borates, prior to dehydration, are inclined to be unstable, that is, they will dry out and throw off moisture, although they will not absorb moisture, or become deliquescent to any extent. If dehydrated by calcining to a degree, sufficient to raise the borate radical content to approximately 50%, they then become deliquescent.

Accordingly, it is an object of the present invention to obtain commercial borates, by dehydrating minerals containing a borate radical ($B_2O_3$) thereby to remove at least part of the water of crystallization forming a constituent of the borate and to reduce the specific gravity of such material, thereby to obtain a product which is comparatively stable, and non-deliquescent, and in which the $B_2O_3$ content has been proportionately raised.

As a specific example of such a mineral, reference is made in the description hereinafter to treatment of naturally occurring hydrous sodium borate minerals, of which tinkal is an example, but such reference is not to be construed as limiting, as the process is equally applicable to other minerals containing hydrous sodium borates, such as rasorite and ulexite, and also, to calcium borate minerals of which colemanite is an example.

True octohedral borax has an eight-sided crystal structure, containing 47.81% $B_2O_3$, five molecules of water and is quite stable; hence this product is an ideal example of borate perfection. But most hydrous borates, are as stated, unstable, and contain about 37.81% $B_2O_3$, as well as ten molecules of water.

An important object then of this invention is to change the character of such boron minerals a considerable extent by raising the borate radical ($B_2O_3$) content approximately 10% and reducing the apparent specific gravity obtained by pouring the product into a known volume, without any shaking down, from approximately .830 to approximately .666 while at the same time reducing the water content of the material by approximately 10%, producing from a naturally occurring normally unstable borate, a product containing borax of a nature substantially equivalent to octohedral borax. To this end the boron mineral is dehydrated until borax, of a moisture content very close to that of octohedral borax and containing approximately 47.81% $B_2O_3$, is obtained.

When hydrous sodium borate minerals are heated the usual result is to destroy any crystal formation and obtain a sodium borate with an unstable water content. In other words, if the sodium borate is heated to any temperature which drives off part of the water it will either regain all of the molecules up to ten, or if heated to retain only two or three molecules of water it will absorb up to five molecules of water when standing in the air.

Operations of calcining borax bearing minerals have been conducted in the past, in recognition of this problem, the idea being to calcine at sufficiently high temperatures to remove enough of the water so that there are less than four molecules in the calcined material. This makes a very fine fluffy powder which can be blown to separate it from the shale, iron, or other naturally occurring impurities.

It now has been found, that the mineral can be treated by driving off from the prismatic borax, five molecules of water, or even six molecules, and then letting it re-absorb one molecule, to obtain a reasonably stable borax containing five molecules of water, this dehydrating being accomplished at calcining temperatures much lower than heretofore used, in fact at temperatures only slightly above the boiling point of water, viz., around 230° to 250° F. The resulting material is not fluffy, and is little altered in its shape, still retaining some of the original prismatic crystal formation, which however, has been changed from a transparent to an opaque material.

To the attainment of the above and other objects of the invention which will appear as the description proceeds, reference is made to the accompanying sheet of drawings, in which:—

The figure represents a section through a rotary drier which may be effectively used in following out the method of the present invention.

In the following the process of this invention, the naturally occurring impurities in minerals of this nature, viz., shale, mica and iron are preferably first removed by crushing the ore and separating same from the borate material, as completely as possible, by mechanical or magnetic means after which the boron bearing material is placed in a relatively fixed hopper or reservoir F, and fed therefrom through spout G into a rotary drier H, which is supported by a pair of fixed heads. The drier is heated by hot gas or air from a fuel oil burner (not shown), the gases being forced into the drier through a pipe I. The temperature of the drier is controlled by pyrometers (not shown) connected to thermocouples L. Steam liberated in the process of drying, as well as accumulating dust caused by the revolving action of the furnace or drier is removed by a suitable exhaust mechanism connected to the air pipe K, the dust being collected for any use to which it may be put. The mineral flows through the drier, which is set on an inclination, by gravity and is discharged through spout J.

A typical installation will utilize a drier cylinder approximately eighty feet long, and six feet in diameter, rotating at a speed of about 4 R. P. M. With these proportions it will require in the neighborhood of thirty minutes for the mineral to pass through the drier. As the drier is inclined, it is of course obvious that that angle of the inclination will have a bearing on the length of time required to pass the mineral through the drier cylinder, but the regulation of time required is controlled by either increasing or decreasing the rotary speed of the cylinder. The temperature at the feed end, or where the mineral enters should not exceed 250° F., and the air or gas velocity must be sufficient to remove the steam and dust, about 2000 cubic feet per minute, for a cylinder of the size described. The above proportions may, of course, be varied, and good results have been obtained by use of a drier drum, thirty feet by thirty-four inches, rotating at 10 R. P. M., with an air flow of 1286 cubic feet per minute.

In the drying operation the character of the boron mineral is changed to a considerable extent. The $B_2O_3$ content is raised approximately 10%, the apparent specific gravity is reduced from approximately .830 to approximately .666, the anhydrous boric acid content being increased from approximately 38% to 48%. That is to say the anhydrous boric acid content is increased with relation to the final product because of the decrease or removal of water content which results in a more pure product. The mineral entering the drier contains 40% to 45% water, and the product discharged from 26% to 27%.

It has been found that with temperatures from 217° to 238°, there will be produced a $B_2O_3$ content varying from 46.50% to 47.81%, or very close to octohedral, 238° apparently being an ideal temperature. This is accomplished without caking or apparent swelling, but beyond the 50% point, swelling will take place, and material of 50% $B_2O_3$ content absorbs moisture quite readily. The loss of weight during drying, per unit volume is approximately 20%.

From the foregoing it will be observed that this process dries or dehydrates the material to a point where it is quite stable, and produces a novel material having an increased $B_2O_3$ content, and lower specific gravity than the original material, and that the conditions necessary for continuous satisfactory operation are readily established. Tests have shown that with a fine, granulated borax at the start of the process there is produced a borax running a little drier than octohedral, and which may be brought substantially to octohedral, and that similar results may likewise be obtained with coarser material.

Having thus described my invention, what I claim as new and desire to secure by Letters Patent of the United States, is:—

1. That process of treating naturally occurring hydrous borate minerals in their crude state to produce a pure product and to increase the stability thereof, which comprises magnetically separating impurities from the mineral, then subjecting such mineral to heat maintained between 230° and 250° F. to remove water of crystallization and increase the percentage of $B_2O_3$ therein for such length of time that the final product produced has a percentage content by weight of $H_2O$ and $B_2O_3$ substantially that of pentahydrated octohedral borax, and simultaneously agitating the mineral.

2. That process of treating naturally occurring hydrous borate minerals having an apparent specific gravity of approximately .830 in their crude state to produce a pure product and to increase the stability thereof, which comprises magnetically separating impurities from such mineral, dehydrating the mineral by subjecting same to heat of a controlled temperature not exceeding 250° F. for a predetermined period sufficient to reduce the apparent specific gravity approximately 15%, and to produce a final product which has a percentage content by weight of $H_2O$ and $B_2O_3$ substantially that of pentahydrated octohedral borax, and simultaneously agitating the mineral.

3. That process of treating naturally occurring hydrous borate minerals in their crude state to increase the stability thereof, which comprises subjecting such mineral to a rapid flow of hot gases at a temperature between 230° and 250° F., for such period of time that the final product has a percentage content by weight of $H_2O$ and $B_2O_3$ substantially that of pentahydrated octohedral borax, and simultaneously, mechanically agitating the mineral.

4. That process of treating naturally occurring hydrous borate minerals in their crude state to increase the stability thereof, which comprises dehydrating the minerals at a temperature between 230° and 250° F., under conditions which will remove approximately six molecules of the water of crystallization and then permitting the dehydrated minerals to reabsorb at least one molecule of water.

5. That process of treating naturally occurring hydrous sodium borate minerals in their crude state to increase its stability which comprises dehydrating the mineral at a temperature between 230° and 250° F., thereby removing approximately six molecules of the water of crystallization therein, and increasing proportionately the borate radical content therein, and then adding, by reabsorption, at least one molecule of water.

6. That process of treating naturally occurring hydrous boron minerals having an apparent specific gravity of approximately .830 in their crude state which comprises separating from such mineral a portion of its water of crystallization, by dehydration, and controlling temperature and humidity conditions to a predetermined degree effective to reduce the apparent specific gravity approximately 15% and to raise the $B_2O_3$ content thereof approximately 10% by reducing the water of crystallization content of the mineral approximately 10%, and to produce a final product that has a percentage of $B_2O_3$ and $H_2O$ content substantially that of pentahydrated octohedral borax.

7. That process of treating naturally occurring hydrous boron minerals in their crude state which comprises separating from such mineral a portion of its water of crystallization, by dehydration, to increase the stability thereof, and controlling temperature and humidity conditions to a predetermined degree effective to produce in the mineral a borate radical content approaching that of octohedral borax.

8. That process of treating naturally occurring hydrous sodium borate minerals in their crude state to remove water of crystallization therefrom, which comprises subjecting such mineral to heat maintained between 230° and 250° F., and simultaneously agitating the mineral, for a period of time sufficient to reduce the apparent specific gravity and increase the $B_2O_3$ content to produce a final product having a percentage content of $B_2O_3$ and $H_2O$, substantially that of pentahydrated octohedral borax, while the original prismatic form of the crystals remains substantially unchanged, said increase in content of the borate radical being proportionate to the reduction of water of crystallization.

9. That process of treating a naturally occurring hydrous borate mineral in its crude state, to increase the stability thereof, which comprises dehydrating the mineral at a temperature between 230° to 250° F., under conditions which will result in the removal of approximately five molecules of the water of crystallization, leaving a stable dehydrated mineral containing approximately five molecules of water.

FREDERICK W. CORKILL.